(12) United States Patent
Smaus et al.

(10) Patent No.: US 11,036,505 B2
(45) Date of Patent: Jun. 15, 2021

(54) STORE-TO-LOAD FORWARDING

(71) Applicant: Advanced Micro Devices, Inc., Santa Clara, CA (US)

(72) Inventors: Gregory W. Smaus, Austin, TX (US); Francesco Spadini, Austin, TX (US); Matthew A. Rafacz, Austin, TX (US); Michael Achenbach, Austin, TX (US); Christopher J. Burke, Austin, TX (US); Emil Talpes, San Mateo, CA (US); Matthew M. Crum, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 2524 days.

(21) Appl. No.: 13/723,103

(22) Filed: Dec. 20, 2012

(65) Prior Publication Data

US 2014/0181482 A1  Jun. 26, 2014

(51) Int. Cl.
*G06F 9/30* (2018.01)
*G06F 9/38* (2018.01)

(52) U.S. Cl.
CPC .......... *G06F 9/30043* (2013.01); *G06F 9/384* (2013.01); *G06F 9/3826* (2013.01)

(58) Field of Classification Search
None
See application file for complete search history.

(56) References Cited

U.S. PATENT DOCUMENTS

| | | | | |
|---|---|---|---|---|
| 6,085,302 A | * | 7/2000 | Mahalingaiah | G06F 9/355 711/117 |
| 2007/0288725 A1 | * | 12/2007 | Luick | G06F 9/3828 712/225 |
| 2010/0049952 A1 | * | 2/2010 | Eddy | G06F 9/3834 712/223 |
| 2011/0035570 A1 | * | 2/2011 | Col | G06F 9/3001 712/23 |
| 2013/0212585 A1 | * | 8/2013 | Tran | G06F 9/30189 718/102 |

* cited by examiner

*Primary Examiner* — Scott C Sun

(57) ABSTRACT

An arithmetic unit performs store-to-load forwarding based on predicted dependencies between store instructions and load instructions. In some embodiments, the arithmetic unit maintains a table of store instructions that are awaiting movement to a load/store unit of the instruction pipeline. In response to receiving a load instruction that is predicted to be dependent on a store instruction stored at the table, the arithmetic unit causes the data associated with the store instruction to be placed into the physical register targeted by the load instruction. In some embodiments, the arithmetic unit performs the forwarding by mapping the physical register targeted by the load instruction to the physical register where the data associated with the store instruction is located.

17 Claims, 5 Drawing Sheets

STORE-TO-LOAD FORWARDING

BACKGROUND

Field of the Disclosure

The present disclosure generally relates to store-to-load forwarding for processors.

Description of the Related Art

Processors typically enhance processing efficiency by employing out-of-order execution, whereby instructions are executed in an order different from the program order of the instructions. In order to avoid errors, a processor executing instructions out of order uses memory disambiguation techniques to account for dependencies between load and store instructions. One such memory disambiguation technique is to delay committing store instructions (e.g. writing store data to the processor cache) until the store instructions are ready to be retired. The store instructions, including their respective store data, are maintained in a store buffer at a load/store unit (LSU) until retirement. Using a technique referred to as store-to-load forwarding, a load instruction that is dependent on a store instruction in the store queue is satisfied by providing the store data of the store instruction from the store buffer, so that the load instruction does not retrieve incorrect data from the cache.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-6 illustrate techniques for reducing instruction execution latency by performing store-to-load forwarding at an arithmetic unit of a processor based on predicted dependencies between store instructions and load instructions. In some embodiments, the arithmetic unit maintains a table of store instructions that are awaiting movement to a load/store unit of the instruction pipeline. In response to receiving a load instruction that is predicted to be dependent on a store instruction stored at the table, the arithmetic unit causes the data associated with the store instruction to be placed into the physical register targeted by the load instruction.

Conventionally, processors perform store-to-load forwarding at a load/store unit (LSU) of the instruction pipeline. In particular, the LSU maintains store instructions received from the arithmetic unit in a store buffer, and forwards store data to a dependent load instruction in response to determining a match between the store and load addresses corresponding to the store and load instructions. Accordingly, store-to-load forwarding at the LSU does not take place until the store data has been moved to the store buffer of the LSU. As disclosed further herein, by employing a prediction of which load is dependent on a given store instruction, the instruction pipeline can perform store-to-load forwarding at the arithmetic unit prior to, or concurrent with, movement of the store data to the LSU store buffer. Instructions that are dependent on the load instruction therefore can begin their execution without waiting for the calculation of the store and load addresses, thus reducing instruction execution latency at the instruction pipeline. While the techniques are described herein with respect to an example implementation at a fixed point unit, it will be appreciated that the techniques can also be implemented at another arithmetic unit, such as a floating point unit.

Figure 1:
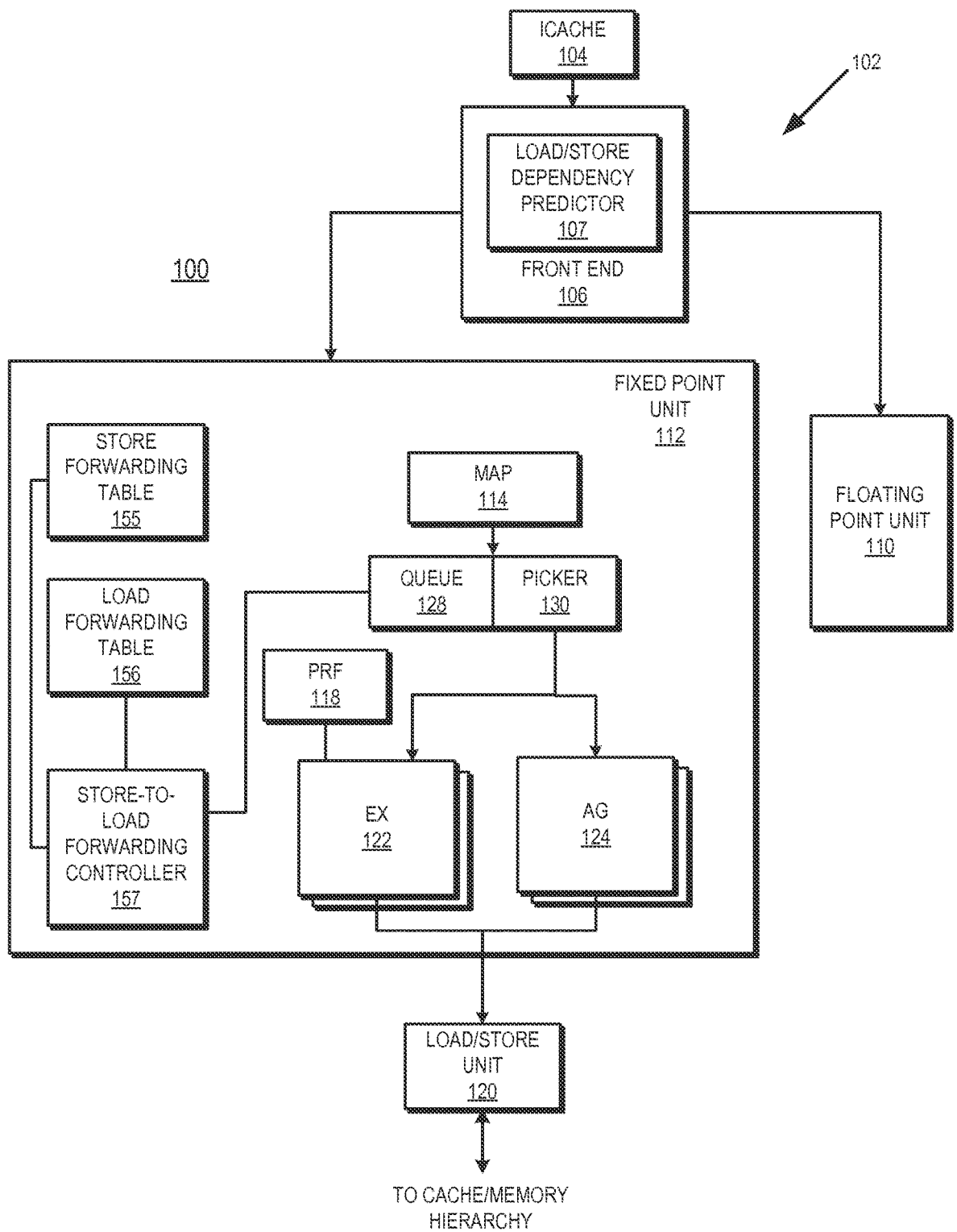
FIG. 1 is a block diagram of a processor core in accordance with some embodiments.

FIG. 1 illustrates a processor core 100 of a processor having an execution pipeline 102 that implements the same physical register for both the result and a source operand for load-execute operations in accordance with some embodiments. The illustrated processor core 100 can include, for example, a central processing unit (CPU) core based on an x86 instruction set architecture (ISA), an ARM ISA, and the like. The processor can implement a plurality of such processor cores, and the processor can be implemented in any of a variety of electronic devices, such as a notebook computer, desktop computer, tablet computer, server, computing-enabled cellular phone, personal digital assistant (PDA), set-top box, and the like.

In the depicted example, the processor core 100 implements an execution pipeline 102 including an instruction cache 104, a front end 106, one or more floating point units 110, and one or more fixed point units 112 (also commonly referred to as "integer execution units"). The processor core 100 also includes a load/store unit (LSU) 120 connected to a memory hierarchy, including one or more levels of cache (e.g., L1 cache, L2, cache, etc.), a system memory, such as system RAM, and one or more mass storage devices, such as a solid-state drive (SSD) or an optical drive.

The instruction cache 104 stores instruction data which is fetched by a fetch unit of the front end 106 in response to demand fetch operations (e.g., a fetch to request the next instruction in the instruction stream identified by the program counter) or in response to speculative prefetch operations. A decode unit of the front end 106 decodes instructions fetched by the fetch unit into one or more operations that are to be performed, or executed, by either the floating point unit 110 or the fixed point unit 112. In a microcoded processor architecture, this decoding can include translating the instruction into one or more micro-operations (uOps), whereby each uOp is identified by a corresponding opcode value and can be separately executed within the fixed point unit 112. Those operations involving floating point calculations are dispatched to the floating point unit 110 for execution, whereas operations involving fixed point calculations are dispatched to the fixed point unit 112.

The front end 106 also includes a load/store dependency predictor 107 that predicts if a fetched load instruction is dependent on a previously fetched store instruction. As used herein, Instruction B is dependent on Instruction A if a source operand of Instruction B matches a destination operand of Instruction A, and there are no intervening instructions having the same destination operand as Instruction A. Thus, a load instruction is dependent on a store instruction if the load instruction loads data from a memory address targeted by the store instruction (as indicated by the destination operand of the store instruction), and there are no intervening instructions that store data to the memory address. For example, in the following instruction sequence:

ST [mem], RAX (STORE1)
LD RBX, [mem] (LOAD1)
ADD RCX, [mem] (ADD1)
LD RCX, [mem] (LOAD2)

the LOAD1 and LOAD2 instructions are both dependent on the STORE1 instruction because the LOAD1 and LOAD2 instructions both load data from the memory address indicated by the destination operand of the STORE1 instruction, and there are no intervening instructions that store data to the memory address. In addition, the ADD1 instruction is dependent on the LOAD1 instruction because the ADD1 instruction uses the destination operand (RBX) of the LOAD1 instruction as one of its source operands. As used herein, instructions that are dependent on a given load instruction, or that are dependent on instructions that are dependent on the given load instruction, are referred to as the children of the load instruction. In some embodiments, an instruction can be dependent on another instruction only if the instructions share a common operand data type. In some embodiments, an instruction can be dependent on an instruction that has a different operand data type and the instruction pipeline converts the operands to a common data type.

In some embodiments, the load/store dependency predictor 107 predicts dependencies based on the memory address operands of fetched load and store instructions. In particular, the memory address operand of a load or store instruction identifies values that are used, as described further herein, to calculate the memory address to be accessed by the instruction. Accordingly, the load/store dependency predictor 107 can perform a defined set of logical operations (e.g. a hash function) on the memory address operand to determine a predicted address. In some embodiments, the set of logical operations is defined such that it can be performed relatively quickly so as not to substantially impact the rate at which the front end 106 processes instructions. Accordingly, the load/store dependency predictor 107 does not have time to calculate the full physical address associated with a load or store instruction, and therefore there is some chance that the predicted address will vary from the full physical address targeted by the load or store instruction.

The load/store dependency predictor 107 compares the predicted address for each load instruction to the predicted address for a set of store instructions, whereby a match in the predicted addresses indicates a prediction that the load instruction is dependent on the matching store instruction. In some embodiments, the set of store instructions is selected by the load/store dependency predictor 107 to reduce the likelihood that there are intervening instructions that sever the dependency between the load and store instructions predicted as dependent. For example, the load/store dependency predictor 107 can apply a sliding window to received load and store instructions, and only compare the predicted address for a load instruction to the predicted addresses of the store instructions that share the window with the load instruction. In response to predicting that a load instruction is dependent on a store instruction, the load/store dependency predictor 107 indicates the dependency to the fixed point unit 112.

The fixed point unit 112 includes a map unit 114, a scheduler unit 116, a physical register file (PRF) 118, and one or more execution (EX) units 122, such as one or more arithmetic logic units (ALUs), and one or more address generation (AG) units 124. The PRF 118 stores a set of physical registers, each of which is associated with a different physical register name (PRN). For convenience, as used herein the PRN can refer to the name of the physical register, and can refer to the physical register that has that name. Thus, for example, "storing data at a PRN" indicates that the data is stored at the physical register identified by the PRN.

The scheduler unit 116 includes a scheduler queue 128 and a picker 130. In an operation of the fixed point unit 112, the map unit 114 receives operations from the decode unit 108 (usually in the form of operation codes, or opcodes). These dispatched operations typically also include, or reference, operands used in the performance of the represented operation, such as a memory address at which operand data is stored, an architected register at which operand data is stored, one or more constant values (also called "immediate values"), and the like. The map unit 114 and the scheduler unit 116 control the selective distribution of operations among the EX units 122 and AG units 124, whereby operations to be performed are queued in the scheduler queue 128 and then picked therefrom by the picker 130 for issue to a corresponding EX unit or AG unit. Typically, each queue entry of the scheduler queue 128 includes a field to store the operation payload or operation identifier (e.g., the opcode for the operation), fields for the addresses or other identifiers of physical registers that contain the source operand(s) for the operation, fields to store any immediate or displacement values to be used the operation, and a destination field that identifies the physical register in which the result of the execution of the corresponding operation is to be stored. For example, a store instruction includes a movement operation to move data to an LSU, an architected register operand indicating the PRN that stores the data to be stored (the store data) and address information used to calculate a memory address where the data is to be stored.

Prior to storing an operation in the scheduler queue 128, the map unit 114 performs register renaming whereby external operand names (that is, architected register names (ARNs)) are translated into internal operand names (that is, PRNs). This renaming process includes the map unit 114 evaluating a subset of operations including the operation to be queued to identify some dependencies between sources and destinations associated with the operations, and then mapping architected registers to physical registers so as to avoid false dependencies and facilitate parallel execution of independent operations as using register renaming techniques known in the art.

The picker 130 monitors the scheduler queue 128 to identify operations ready for execution, and upon picking an available operation and verifying its operands are ready and available, dispatches the operation to an EX unit or an AG unit. The picker 130 waits to pick operations for a dependent instruction until it receives an indication that the operations for the instructions from which the dependent instruction depends have been satisfied. In response to receiving the indication, the picker 130 sets a status of the child to indicate that it can be picked for execution, and picks the child instruction according to the availability of the requisite EX unit or AG unit. This setting of the status for the child instruction is sometimes referred to as "waking" the child instruction.

Operations requiring retrieval or storage of data, such as load or store operations, are dispatched by the picker 130 to an AG unit 124, which calculates the memory address associated with the operation and directs the LSU 120 to perform the corresponding memory access using the generated address. Operations requiring numerical manipulations or other arithmetic calculations are dispatched to the appropriate EX unit 122 for execution.

The address generation operations performed by the AG units 124 and the arithmetic operations performed by the EX units 122 typically utilize operand data, in the form of one or both of operands stored in source registers immediate/displacement values. The immediate/displacement value used during execution operation is dispatched to the EX/AG unit along with the operation from the scheduler queue 128. The source operands stored in the physical registers are read from the PRF 118 and provided to the corresponding EX/AG unit for use in executing the operation. Typically, these source operands are obtained by initiating a PRF read to the PRF 132.

Load operations performed by the AG unit 124/LSU 120 and arithmetic operations performed by the EX unit 122 result in data that is to be stored in the physical register identified as the destination of the load operation or arithmetic operation. Accordingly, each of the EX unit 122 and the LSU 120, upon generating a result (either by completing an arithmetic operation for the EX unit 122 or by loading data from the memory hierarchy for the LSU 120), initiates a PRF write to the destination PRN of the load instruction.

For store instructions, the picker 130 picks a movement operation associated with the store instruction to cause the EX unit 122 to move the data from the register to the LSU 120. The LSU 120 places the store data into a store queue, and communicates with the memory hierarchy to store the data at the calculated memory address.

The fixed point unit 112 includes a store forward table 155, a load forward table 156, and a store-to-load forwarding (SLF) controller 157 to effectuate store-to-load forwarding. In response to receiving a store instruction at the fixed point unit 112, the SLF controller 157 stores data identifying the store instruction at the store forward table 155. In some embodiments, the SLF controller 157 replaces the oldest store instruction at the store forward table 155 with the most recently received store instruction. In some embodiments, the SLF controller 157 invalidates the entries of selected store instructions based on defined criteria, such as whether the move operation for the store instruction has been completed, whether the store instruction has been flushed from the instruction pipeline, and the like. The SLF controller 157 replaces invalidated entries of the store forward table 155 with received store instruction first, and if all entries of the store forward table 155 are indicated as valid replaces the entry corresponding to the oldest store instruction. In some embodiments, only a subset of store instructions are eligible for storage at the store forward table. For example, in some embodiments only store instructions that are indicates as having write access to the PRF 132 and indicated as having access to an operand bypass network of the execution pipeline 102 are eligible to be stored at the store forward table 155.

In response to receiving a load instruction at the fixed point unit 112, the SLF controller 157 determines if the load/store dependency predictor 107 has indicated that the load instruction is predicted to be dependent on a store instruction. If not, the SLF controller 157 indicates to the picker 130 that the load instruction is to be provided to the LSU 120. In response, the picker 130 picks the load instruction after its memory address has been calculated, and provides the instruction to the LSU 120 for completion. The LSU 120 can determine, based on the calculated memory address, if the load instruction is dependent on any store instruction at its store queue and, if so, forward the store data for the store instruction to the load instruction. If the load instruction is not dependent on a store instruction at the store queue, the LSU 120 retrieves the load data from the address indicated by the instruction and provides it to the fixed point unit 112, which stores it at the PRN indicated by the destination operand of the load instruction.

If the load/store dependency predictor 107 indicates that the load instruction is dependent on a store instruction, the SLF controller 157 determines if the store instruction is identified at the store forward table 155. If not, the SLF controller 157 indicates to the picker 130 that the load instruction is to be provided to the LSU 120 and the load instruction is processed as described above. If the store instruction is identified at the store forward table 155, the SLF controller 157 allocates an entry at the load forward table 156 for the load instruction and stores information identifying the load instruction, the store instruction upon which it depends, and the PRN for the load instruction at the allocated entry. The allocation of an entry for a load instruction based on the predicted dependency is referred to herein as "linking" the load instruction to the store instruction from which it is predicted to depend.

In response to the initiation of a movement operation for a store instruction, the SLF controller 157 determines if any allocated entry of the load forward table 156 stores information for a load instruction that is linked to the store instruction. If so, the SLF controller 157 sends control information to the EX unit 122 so that the store data is transferred to the PRN of the load instruction concurrent with the store data being moved to the LSU 120. The store data is thereby forwarded to the load instruction prior to completion of the movement of the store data to the LSU 120, reducing the latency of the store instruction.

Because the store data has been forwarded to the load instruction, the data is available for children of the load instruction. Accordingly, in response to forwarding data from a store instruction to a load instruction the SLF controller 157 sends information to the picker 130 indicating that any children of the load instruction can be selected for execution. Because the store-to-load forwarding is performed concurrent with the store data being moved to the LSU 120, the children of the load instruction can be picked earlier, thus reducing execution latency for the children.

In response to forwarding data to a load instruction, the SLF controller 157 can take additional actions to enhance processing efficiency. For example, in some cases the load instruction to which data is forwarded may have been moved to the LSU 120 for execution. Accordingly, in response to forwarding data to the load instruction, the SLF controller 157 can send a notification to the LSU 120 to suppress execution of the load instruction, either by store-to-load forwarding at the LSU 120 or by retrieving the load data from the memory hierarchy.

As indicated above, in some cases the prediction information provided by the load/store dependency predictor 107 can incorrectly predict a dependency. Accordingly, in some embodiments a retire stage (not shown) or other stage of the execution pipeline 102 (e.g. the LSU 120) can confirm a store-to-load forward by comparing the calculated memory address for the load instruction to which data was forwarded to the calculated memory address for the store instruction from which data was forwarded. In response to determining the addresses do not match, or if the store instruction's calculated memory addresses is no longer available for comparison (e.g. because the store instruction has committed), the retire stage or other stage indicates an error and the execution pipeline 102 takes remedial action, such as synchronizing the pipeline to an earlier stored state.

Figure 2:
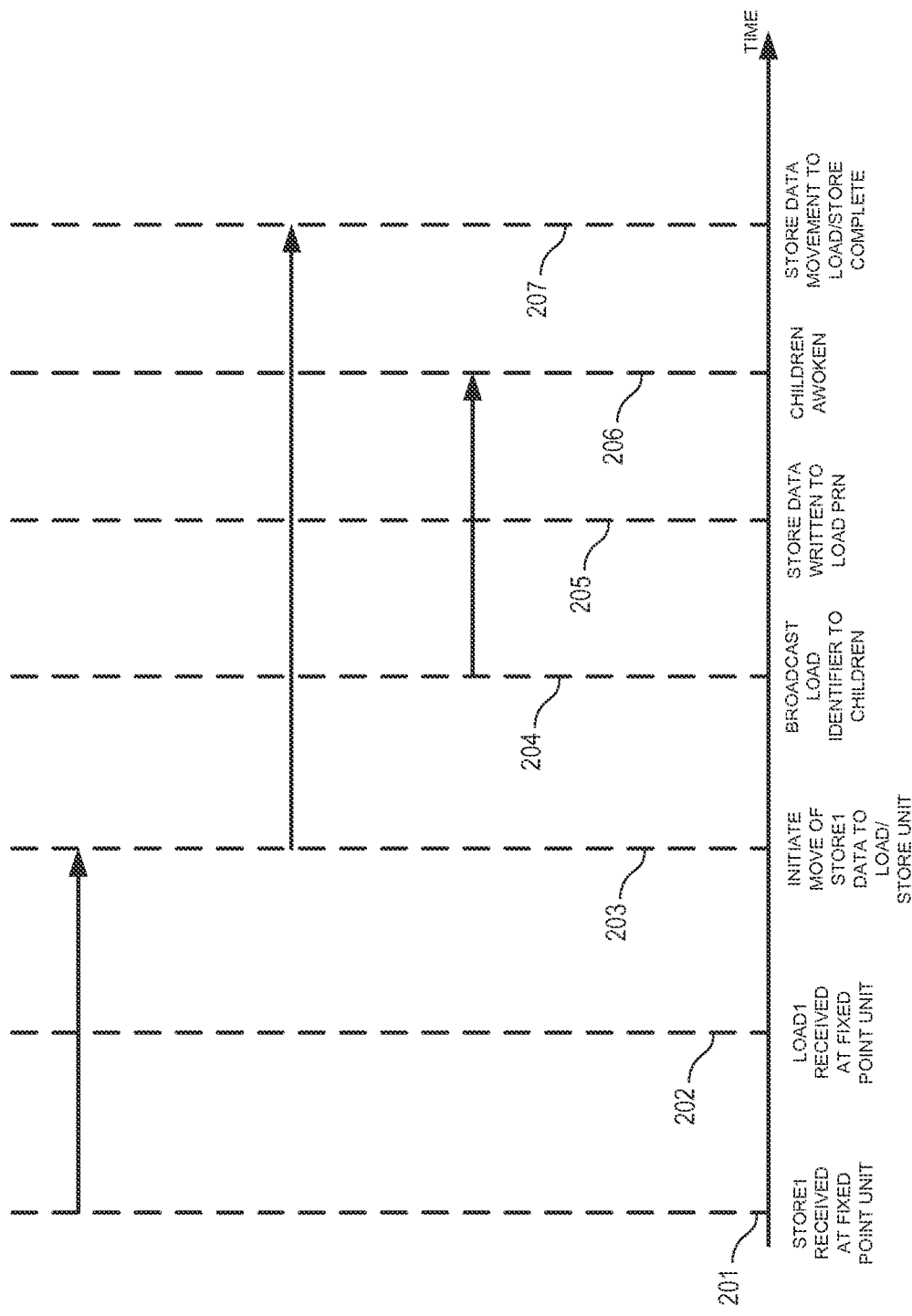
FIG. 2 is a diagram of a timeline illustrating store-to-load forwarding at a fixed point unit of the processor core of FIG. 1 in accordance with some embodiments.

FIG. 2 depicts a timeline 200 illustrating store-to-load forwarding in accordance with some embodiments. Timeline 200 is described with respect to an example implementation at the processor core 100 (FIG. 1). At time 201, a store instruction designated "STORE1" is received at the fixed point unit 112. In response, the SLF controller 157 stores information identifying STORE1 at the store forward table 155. The store instruction operations are stored at the scheduler queue 128. At time 202 a load instruction designated LOAD1 is received at the fixed point unit 112, and the load/store dependency predictor 107 indicates that LOAD1 is predicted to be dependent on STORE1. Accordingly, the SLF controller 157 allocates an entry for LOAD1 at the load forward table 156, thereby linking LOAD1 to STORE1.

The entry for LOAD1 is maintained at the load forward table 156 for store-to-load forwarding. At time 203 the picker 130 picks the movement operation for STORE1, initiating movement of the store data for STORE1 to the LSU 120. In response, the SLF controller 157 initiates the transfer of the store data from the STORE1 PRN to the PRN for LOAD1, as indicated by the load forward table 156. In addition, at time 204 the SLF controller 157 broadcasts an identifier for LOAD1 to the picker 130, indicating that children of LOAD1 can be selected for execution.

At time 205 transfer of the store data to the PRN for LOAD1 has completed. Accordingly, at time 206 execution of the children of the LOAD1 instruction is initiated. At time 207 the store data for STORE1 has completed its movement to the LSU 120. Conventional store-to-load forwarding at the LSU 120 can therefore be initiated. Thus, in the illustrated example, the execution of the children of LOAD1 has been initiated before store-to-load forwarding for LOAD1 could be initiated at the LSU 120. Performing store-to-load forwarding at the fixed point unit 112 thus reduces execution latency both for LOAD1 and for the children of LOAD1.

Figure 3:
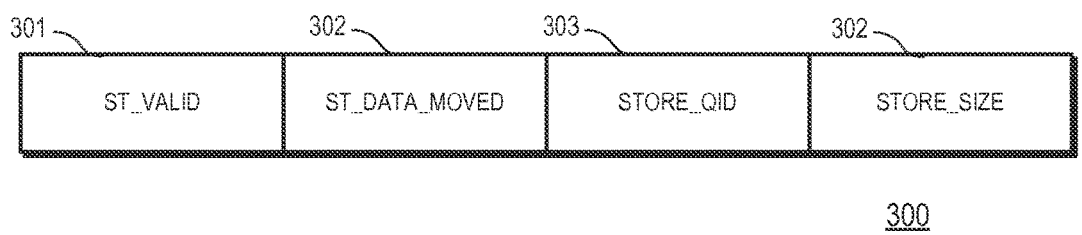
FIG. 3 is a block diagram of an entry of a store forward queue used to perform store-to-load forwarding at the fixed point unit of the processor core of FIG. 1 in accordance with some embodiments.

FIG. 3 illustrates an entry 300 of the store forward table 155 that records information for a received store instruction in accordance with some embodiments. In the example of FIG. 3, the entry 300 stores information for the STORE1 instruction. The entry 300 includes a valid field 301, a data moved field 302, a queue ID field 303, and a store size field 304. The valid field 301 indicates whether the STORE1 instruction is a valid instruction for purposes of store-to-load forwarding at the fixed point unit 112. In particular, in response to receiving a load instruction, the SLF controller 157 determines if the load instruction is dependent on any store instructions that have valid entries in the store forward table 155. Load instructions dependent on store instructions that are absent from the store forward table 155 or having entries at the store forward table 155 in an invalid state are not eligible for store-to-load forwarding at the fixed point unit 112 (although store data may still be forwarded to the load at the LSU 120).

The SLF controller 157 sets the valid field 301 to the valid state in response to the STORE1 instruction being stored at the scheduler queue 128. The SLF controller 157 sets the valid field 301 to the invalid state in response to any one of a number of conditions such as: 1) STORE1 is flushed from the execution pipeline 102 (e.g. because the STORE1 instruction results from a mispredicted branch), 2) the data associated with STORE1 has completed its movement to the LSU 120, so that the store data is no longer available for forwarding at the fixed point unit 112; or 3) the SLF controller 157 has determined that a received load instruction is predicted as dependent on STORE1. By setting the valid field 301 to the invalid state in response to determining that a load instruction is predicted as dependent on STORE1, the SLF controller 157 ensures that the store data for STORE1 can only be forwarded to one load instruction.

The data moved field 302 can be selectively set to one of two different states: an unmoved state, indicating that the store data for STORE1 is not in the process of being moved to the LSU 120, and a moved state indicating that the movement operation for STORE1 has been picked by the picker 130 and the store data is in the process of being moved to the LSU 120. The SLF controller 157 sets the data moved field 302 to the unmoved state in response to STORE1 being stored at the scheduler queue 128. In response to the movement operation for STORE1 being picked for execution by the picker 130, the SLF controller 157 sets the data moved field 302 to the moved state. In response to receiving an indication that the movement operation for STORE1 was unsuccessful (e.g. an error occurred in the execution of the movement operation), the SLF controller 157 resets the data moved field 302 to the unmoved state. In response to receiving an indication that the movement operation for STORE 1 was successful, the SLF controller 157 sets the valid field 301 to the invalid state.

The data moved field 302 is used by the SLF controller 157 to determine when a load instruction can be linked to a store instruction. In particular, if the data moved field 302 is in the moved state, a load instruction cannot be linked to the store instruction associated with that entry of the store forward table 155. The queue ID field 303 stores an identifier (referred to as a queue ID) indicating the entry of the scheduler queue 128 that stores the STORE1 instruction.

The store size field 304 stores information indicating a size of the store data for STORE1. In some embodiments, the load/store dependency predictor 107 can predict that a load having a given data operand size is dependent on a store instruction having a different data operand size. In this scenario, forwarding data from the store instruction to the load instruction can result in program execution errors. Accordingly, in response to receiving a prediction that a load is dependent on a store instruction, the SLF controller 157 compares a size of the data operand for the load instruction to the store size field 304. In response to determining a mismatch in the sizes, the SLF controller 157 ensures that the received load instruction is not linked to the entry of the store instruction at the store forward table 155, thereby preventing store-to-load forwarding for the load instruction.

Figure 4:
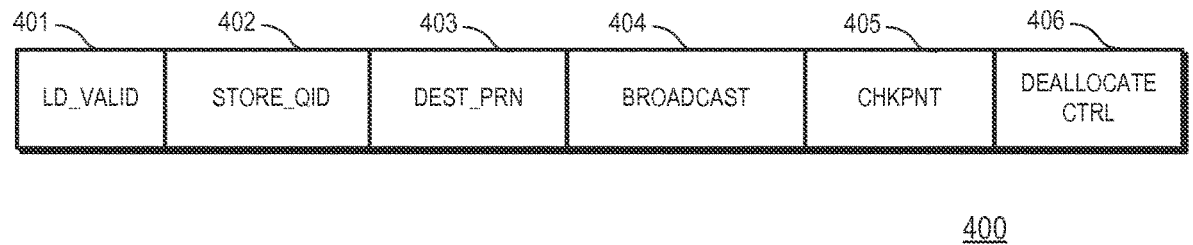
FIG. 4 is a block diagram of an entry of a load forward queue used to perform store-to-load forwarding at the fixed point unit of the processor core of FIG. 1 in accordance with some embodiments.

FIG. 4 illustrates an entry 400 of the load forward table 156 that records information for a received load instruction in accordance with some embodiments. In the example of FIG. 4, the entry 400 stores information for the LOAD1 instruction. The entry 400 includes a validity field 401, a store queue ID field 402, a destination PRN field 403, a broadcast field 404, a checkpoint ID field 405, and a deallocation control field 406.

The SLF controller 157 can selectively place the validity field 401 in one of two states: a valid state and an invalid state. The SLF controller 157 places the validity field 401 in the valid state in response to 1) receiving the LOAD1 instruction; 2) determining that the LOAD1 instruction is predicted as being dependent on a store instruction; 3) the store instruction from which the LOAD1 instruction is predicted to depend has a valid entry at the store forward table 155; and 4) the store instruction from which the LOAD1 instruction is predicted to depend has the data moved field 302 in an unmoved state at the store forward table 155. By placing the validity field 401 in the valid state and storing information for the LOAD1 instruction at the remaining fields of the entry 400, the SLF controller 157 allocates the entry to the LOAD1 instruction. By placing the validity field 401 in the invalid state, the SLF controller 157 deallocates the entry 400 for LOAD1, so that the entry is available for allocation to a different load instruction. The SLF controller 157 places the validity field 401 in the invalid state in response to 1) LOAD1 being flushed from the execution pipeline 102; or 2) the EX unit 122 has completed movement of the store data for the store instruction to which LOAD1 is linked to the LSU 120 and LOAD1's tag has been broadcast to the scheduler queue 128 to wake up LOAD1's children.

The store queue ID field 402 stores an identifier (the queue ID) indicating the location in the scheduler queue 128 that stores the store instruction to which LOAD1 is linked. In response to picking a movement operation for a store instruction, the picker 130 indicates the queue ID for the store instruction to the SLF controller 157, which compares the queue ID to the store queue ID fields for valid entries of the load forward table 156. In response to determining a match, indicating a load instruction is linked to the picked store instruction, the SLF controller 157 initiates forwarding of the store data to the linked load instruction, as described further herein.

The destination PRN field 403 indicates the PRN of PRF 118 that is the destination operand for the LOAD1 instruction. In response to determining that LOAD1 is linked to a store operation whose movement operation has been picked by the picker 130, the SLF controller 157 sends control signaling to the EX unit 122 to copy the store data to the PRN indicated by the PRN field 403. The PRN field 403 is also used as the tag for LOAD1 that is broadcast to the scheduler queue 128 to wake up the children of LOAD1.

The broadcast field 404 indicates whether LOAD1's tag is being broadcast to wake up LOAD1's children. To illustrate, in response to the movement operation for LOAD1's linked store operation being picked for execution, the SLF controller 157 sets the broadcast field 404 to an asserted state and broadcasts LOAD1's tag, thereby notifying the picker 130 that the children of LOAD1 are available to be picked for execution, thus waking LOAD1's children concurrently with forwarding store data to LOAD1. By the time LOAD1's children are picked, the data has completed forwarding, ensuring proper execution of LOAD1's children. The broadcast field 404 can be cleared in response to any of a number of conditions, including the movement operation for the store data resulting in an error or the broadcasting of LOAD1's tag information to the scheduler queue 128.

After it has been asserted, the SLF controller 157 can clear the broadcast field 404 in response to a number of conditions, including the movement operation of the store data results in an error or the LOAD1 instruction has been flushed. By clearing the broadcast field 406, the SLF controller 157 indicates to the picker 130 that any children of LOAD1 should not be picked for execution.

The checkpoint ID field 405 stores an identifier (referred to as the checkpoint ID) that the SLF controller 157 uses to determine whether LOAD1 has been flushed. To illustrate, the execution pipeline 102 periodically stores state information, collectively referred to as a checkpoint, in response to defined events, such as taking a predicted branch. The execution pipeline 102 assigns the checkpoint a checkpoint ID and instructions are associated with the most recent checkpoint ID. In response to determining a defined condition has been met, such as detecting that the predicted branch was the result of a misprediction, the execution pipeline 102 synchronizes its state with the checkpoint associated with the defined condition. This synchronization is referred to as a resync. The resync flushes any instructions that resulted from the misprediction or other defined condition. In response to allocating an entry for a load instruction, the SLF controller 157 stores the checkpoint ID associated with the load instruction at the checkpoint ID field 405. In response to the execution pipeline 102 indicating a resync, the SLF controller 157 compares the checkpoint ID for the resync (the checkpoint ID for the checkpoint to which the execution pipeline is being synchronized) to the checkpoint ID stored at the checkpoint ID field 405. In response to a match, the SLF controller 157 determines that the load instruction for the entry is being flushed, and clears the broadcast field 406 to ensure that the children of the load instruction are not picket for execution. In addition, the SLF controller 157 sets the valid field 401 to the invalid state, thereby deallocating the load instruction for entry 400, thereby preventing store-to-load forwarding at the fixed point unit 112 for the flushed load instruction.

The deallocation control field 406 stores information the SLF controller 157 uses to determine whether to set the valid field 401 to the invalid state, thereby deallocating LOAD1 for the entry 400. In some embodiments, the deallocation control field 406 indicates whether movement operation for the store instruction to which LOAD1 is linked has been picked and whether the store data for the store instruction has completed its movement to the LSU 120. In response to the deallocation control field 406 indicating that movement of the store data to the LSU 120 is complete and the broadcast field 404 being in a clear state, thus indicating there is not a pending broadcast of the tag for LOAD1, the SLF controller 157 sets the valid field 401 to the invalid state, thereby deallocating LOAD1 from the entry 400.

Figure 5:
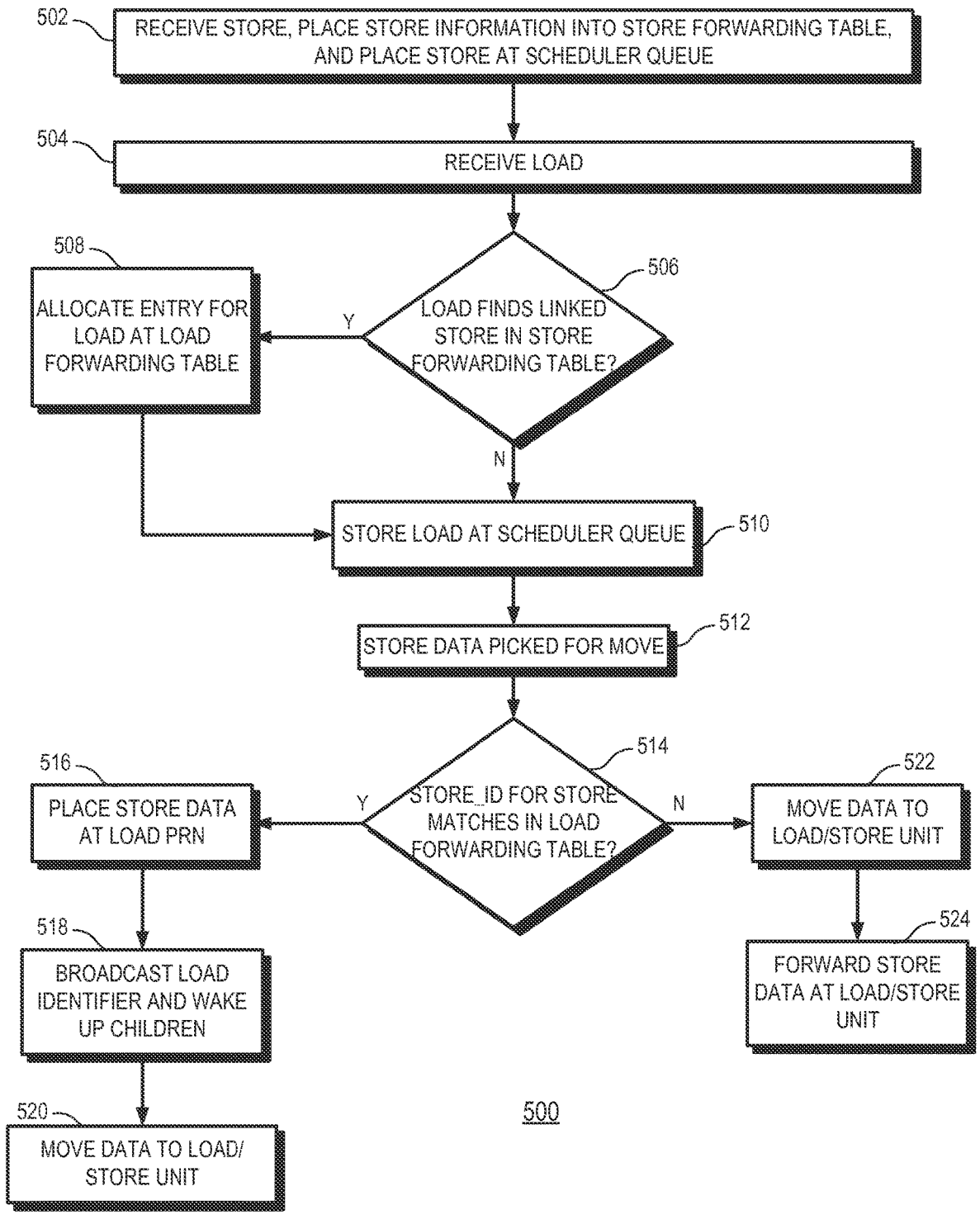
FIG. 5 is a flow diagram of a method of performing store-to-load forwarding at a fixed point unit of a processor in accordance with some embodiments.

FIG. 5 illustrates a flow diagram of a method 500 of performing store-to-load forwarding at a fixed point unit of a processor in accordance with some embodiments. The method 500 is described with respect to an example implementation at the processor core 100 of FIG. 1. At block 502 the fixed point unit 112 receives a store instruction. In response, the scheduler queue 128 stores the store instruction and the SLF controller 157 stores forwarding information for the store instruction at an entry of the store forwarding table 155. At block 504 the fixed point unit 112 receives a load instruction. At block 506 the SLF controller 157 determines if the load/store dependency predictor 107 indicates that the received load instruction is predicted to be dependent on a store instruction in the store forwarding table 155. If this condition is satisfied, the method flow moves to block 508 and the SLF controller 157 allocates an entry for the load instruction at the load forward table 156. If this condition is not satisfied, the method flow moves to block 510 and the fixed point unit 112 stores the load instruction at the scheduler queue 128 without the SLF controller 157 allocating an entry at the load forward table 156.

At block 512 the picker 130 picks a movement operation for a store instruction for execution. In response, at block 514 the SLF controller 157 determines if the queue ID for the store instruction matches the queue ID at store queue ID field of the load forward table 156. If the SLF controller 157 determines a match, the store instruction is linked to the load instruction associated with the entry of the load forward table 156 that resulted in the match. Accordingly, at block

516 the SLF controller 157 sends control signaling to the EX unit 122 to place the store data in the PRN of the linked store instruction. The method flow moves to block 518 and the SLF controller 157 broadcasts the tag information for the linked load instruction to the picker 130. In response, the picker 130 picks the children of the linked load instruction, as indicated by the tag information, for execution. The method flow proceeds to block 520 and the EX unit 122 completes the movement of the store data to the LSU 120, which transfers the store data to the memory hierarchy.

Returning to block 514, if the SLF controller 157 determines that the queue ID for the picked store instruction does not match any queue ID at the load forwarding table 156, the method flow moves to block 522 and the EX unit 122 completes the movement of the store data to the LSU 120 without store-to-load forwarding taking place at the fixed point unit 112. The method flow moves to block 524 and the LSU 120 performs store-to-load forwarding for a load instruction that is dependent on the store instruction.

In some embodiments, at least some of the functionality described above may be implemented by one or more processors executing one or more software programs tangibly stored at a computer readable medium, and whereby the one or more software programs comprise instructions that, when executed, manipulate the one or more processors to perform one or more functions of the processing system described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
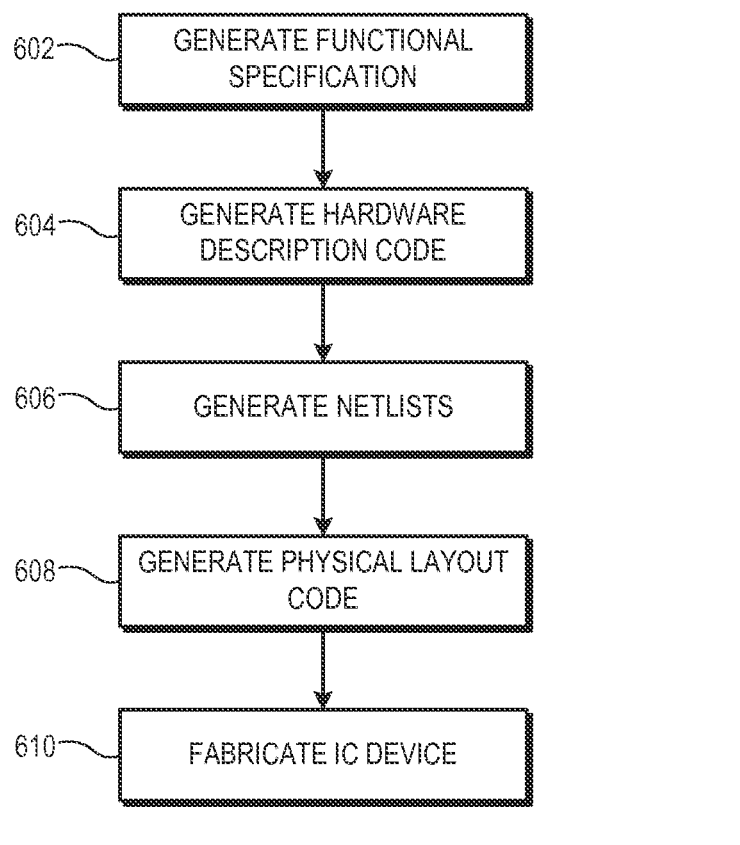
FIG. 6 is a flow diagram illustrating a method for designing and fabricating an integrated circuit device implementing at least a portion of a component of a processor in accordance with some embodiments.

FIG. 6 is a flow diagram illustrating an example method 600 for the design and fabrication of an IC device implementing one or more aspects in accordance with some embodiments. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 606 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method includes forwarding, at an arithmetic unit of an instruction pipeline, data associated with a store instruction to satisfy a load instruction concurrent with moving the data to a load/store unit of the instruction pipeline. In some aspects forwarding comprises forwarding the data to the load instruction in response to a prediction that the load is dependent on the store instruction. In some aspects forwarding comprises forwarding the data in response to the data having not been moved from the arithmetic unit to a load/store unit of the instruction pipeline. In some aspects forwarding comprises storing the data at a physical register targeted by the load instruction in response to moving the data from the arithmetic unit to a load/store unit of the instruction pipeline. In some aspects the method further includes initiating execution of an instruction that depends on the load instruction in response to forwarding the data to the load instruction. In some aspects forwarding comprises forwarding the data in response to determining a size of the data associated with the store instruction matches a size of data associated with the load instruction.

In some embodiments, a method includes, in response to a prediction at an instruction pipeline that a first load instruction is dependent on a first store instruction, forwarding data associated with the first store instruction to satisfy the first load instruction prior to moving the data to a load/store unit of the instruction pipeline. In some aspects the method further includes storing the first store instruction at a first table; storing the first load instruction at a second table in response to determining the store instruction is stored at the first table and the data associated with the first store instruction has not been moved to the load/store unit; and forwarding the data to the first load instruction in response to determining that the data associated with the first store instruction is being moved to the load/store unit and the first load instruction is stored at the second table. In some aspects, the method further includes storing a second store instruction at the first table; and suppressing storage of a second load instruction that is dependent on the second store instruction at the second table in response to determining that data associated with the second store instruction has been moved to the load/store unit. In some aspects the method further includes forwarding the data associated with the second store instruction to the second load instruction at the load/store unit.

In some embodiments, a processor includes a cache; and an instruction pipeline comprising: a load/store unit to load and store data from and to the cache; an arithmetic unit to forward data associated with a store instruction to satisfy a load instruction concurrent with moving the data associated with the store instruction to the load/store unit. In some aspects, the processor includes a front end to provide a prediction that the load instruction is dependent on the store instruction; and the arithmetic unit is to forward the data to the load instruction in response to a prediction that the load is dependent on the store instruction. In some aspects the arithmetic unit is to forward the data in response to determining that the data has not been moved from the arithmetic unit to a load/store unit of the instruction pipeline. In some aspects the arithmetic unit is to forward the data by remapping a first physical register targeted by the load instruction to a second physical register targeted by the store instruction. In some aspects the arithmetic unit is to forward the data by storing the data at a physical register targeted by the load instruction in response to moving the data to the load/store unit. In some aspects the arithmetic unit is to initiate execution of an instruction that depends on the load instruction in response to forwarding the data to the load instruction. In some aspects the arithmetic unit is to forward the data in response to determining a size of the data associated with the store instruction matches a size of data associated with the load instruction.

In some embodiments, a computer readable medium stores code to adapt at least one computer system to perform a portion of a process to fabricate at least part of a processor including: a cache; and an instruction pipeline comprising: a load/store unit to load and store data from and to the cache; and an arithmetic unit to forward data associated with a store instruction to a load instruction. In some aspects the instruction pipeline further comprises a front end to provide a prediction that the load instruction is dependent on the store instruction; and the arithmetic unit is to forward the data to the load instruction in response to a prediction that the load is dependent on the store instruction. In some aspects the arithmetic unit is to forward the data in response to the data having not been moved from the arithmetic unit to a load/store unit of the instruction pipeline. In some aspects the arithmetic unit is to forward the data by remapping a first physical register targeted by the load instruction to a second physical register targeted by the store instruction. In some aspects the arithmetic unit is to forward the data by storing the data at a physical register targeted by the load instruction in response to moving the data to the load/store unit. In some aspects the arithmetic unit is to initiate execution of an instruction that depends on the load instruction in response to forwarding the data to the load instruction.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
forwarding, at an arithmetic unit of an instruction pipeline, data associated with a store instruction to satisfy a load instruction that is dependent on the data concurrent with moving the data to a load/store unit of the instruction pipeline.

2. The method of claim 1, wherein forwarding comprises forwarding the data to the load instruction in response to a prediction that the load instruction is dependent on the store instruction.

3. The method of claim 1, wherein forwarding comprises forwarding the data in response to the data having not been moved from the arithmetic unit to a load/store unit of the instruction pipeline.

4. The method of claim 1, wherein forwarding comprises storing the data at a physical register targeted by the load instruction in response to moving the data from the arithmetic unit to a load/store unit of the instruction pipeline.

5. The method of claim 1, further comprising initiating execution of an instruction that depends on the load instruction in response to forwarding the data to the load instruction.

6. The method of claim 1, wherein forwarding comprises forwarding the data in response to determining a size of the data associated with the store instruction matches a size of data associated with the load instruction.

7. A method, comprising:
in response to a prediction at an instruction pipeline that a first load instruction is dependent on a first store instruction, forwarding data associated with the first store instruction to satisfy the first load instruction prior to moving the data to a load/store unit of the instruction pipeline.

8. The method of claim 7, further comprising:
storing the first store instruction at a first table;
storing the first load instruction at a second table in response to determining the store instruction is stored at the first table and the data associated with the first store instruction has not been moved to the load/store unit; and
forwarding the data to the first load instruction in response to determining that the data associated with the first store instruction is being moved to the load/store unit and the first load instruction is stored at the second table.

9. The method of claim 8, further comprising:
storing a second store instruction at the first table; and
suppressing storage of a second load instruction that is dependent on the second store instruction at the second table in response to determining that data associated with the second store instruction has been moved to the load/store unit.

10. The method of claim 9, further comprising forwarding the data associated with the second store instruction to the second load instruction at the load/store unit.

11. A processor comprising:
a cache; and
an instruction pipeline comprising:
a load/store unit to load and store data from and to the cache; and
an arithmetic unit to forward data associated with a store instruction to satisfy a load instruction that is dependent on the data concurrent with moving the data associated with the store instruction to the load/store unit.

12. The processor of claim 11, wherein:
the instruction pipeline further comprises a front end to provide a prediction that the load instruction is dependent on the store instruction; and
the arithmetic unit is to forward the data to the load instruction in response to a prediction that the load is dependent on the store instruction.

13. The processor of claim 12, wherein the arithmetic unit is to forward the data in response to determining that the data has not been moved from the arithmetic unit to a load/store unit of the instruction pipeline.

14. The processor of claim 11, wherein the arithmetic unit is to forward the data by remapping a first physical register targeted by the load instruction to a second physical register targeted by the store instruction.

15. The processor of claim 11, wherein the arithmetic unit is to forward the data by storing the data at a physical register targeted by the load instruction in response to moving the data to the load/store unit.

16. The processor of claim 11, wherein the arithmetic unit is to initiate execution of an instruction that depends on the load instruction in response to forwarding the data to the load instruction.

17. The processor of claim 11, wherein the arithmetic unit is to forward the data in response to determining a size of the data associated with the store instruction matches a size of data associated with the load instruction.

* * * * *

UNITED STATES PATENT AND TRADEMARK OFFICE
CERTIFICATE OF CORRECTION

PATENT NO. : 11,036,505 B2
APPLICATION NO. : 13/723103
DATED : June 15, 2021
INVENTOR(S) : Gregory W. Smaus et al.

Page 1 of 1

It is certified that error appears in the above-identified patent and that said Letters Patent is hereby corrected as shown below:

On the Title Page

Delete "17 Claims, 5 Drawing Sheets", Insert --13 Claims, 5 Drawing Sheets--

In the Claims

At Column 15, Claim 7, Line 29, please delete "A method, comprising: in response to a prediction at an instruction pipeline that a first load instruction is dependent on a first store instruction, forwarding datea associated with the first store instruction to satisfy the first load instruction prior to moving the data to a load/store unit of the instruction pipeline."

At Column 15, Claim 8, Line 36, please delete "The method of claim 7, further comprising: storing the first store instruction at a first table; storing the first load instruction at a second table in response to detemrining the store instruction is stored at the first table and the data associated with the first store instruction has not been moved to the load/store unit; and forwarding the data to the first load instruction in response to detmining that the data associated with the first store instruction is being moved to the load/store unit and the first load instruction is stored at the second table."

At Column 16, Claim 9, Line 1, please delete "The method of claim 8, further comprising: storing a second store instruction at the first table; and suppressing storage of a second load instruction that is dependent on the second store instruction at the second table in response to determining that data associated with the second store instruction has been moved to the load/store unit."

At Column 16, Claim 10, Line 8, please delete "The method of claim 9, further comprising forwarding the data associated with the second store instruction to the second load instruction at the load/store unit."

Signed and Sealed this
Twenty-seventh Day of September, 2022

Katherine Kelly Vidal
*Director of the United States Patent and Trademark Office*